US006977914B2

(12) United States Patent
Paila et al.

(10) Patent No.: US 6,977,914 B2
(45) Date of Patent: Dec. 20, 2005

(54) BROADCAST HAND-OVER IN A WIRELESS NETWORK

(75) Inventors: Toni Paila, Degerby (FI); Harri Pekonen, Raisio (FI)

(73) Assignee: Nokia Corporation, (FI)

( * ) Notice: Subject to any disclaimer, the term of this patent is extended or adjusted under 35 U.S.C. 154(b) by 210 days.

(21) Appl. No.: 10/326,106

(22) Filed: Dec. 23, 2002

(65) Prior Publication Data

US 2004/0120285 A1 Jun. 24, 2004

(51) Int. Cl.[7] ............................................. H04Q 7/00
(52) U.S. Cl. ..................... 370/331; 370/312; 370/432
(58) Field of Search ............................. 370/335, 328, 370/329, 331, 312, 342, 389, 390, 432, 480, 370/485, 486, 487, 350

(56) References Cited

U.S. PATENT DOCUMENTS

| 2002/0038459 | A1 * | 3/2002 | Talmola et al. | 725/81 |
| 2002/0167921 | A1 * | 11/2002 | Vakil et al. | 370/331 |
| 2002/0191567 | A1 * | 12/2002 | Famolari et al. | 370/335 |
| 2003/0100325 | A1 * | 5/2003 | Paila et al. | 455/506 |
| 2003/0157966 | A1 * | 8/2003 | Sato et al. | 455/561 |

OTHER PUBLICATIONS

Internet Engineering Task Force, http://www.ietf.org/internet-drafts/draft-fair-ipdvb-reg-01.txt.
"Digital Video Broadcasting (DVB); DVB Broadcasting For Data Broadcasting", ETSI, EN 301, 192 v1.2.1 (Jun. 1999).
"Digital Video Broadcasting (DVB); Interaction Channel Through the Global System For Mobile Communications (GSM)", ETSI, EN 301, 195 v1.1.1 (Feb. 1999).

* cited by examiner

*Primary Examiner*—Brian Nguyen
(74) *Attorney, Agent, or Firm*—Banner & Witcoff, Ltd.

(57) ABSTRACT

A system and method are disclosed for providing multicast channel handover in a mobile device within a mobile network. First and second transmitters within first and second cells broadcast datagrams associated with a logical identifier according to link-level access parameters common to the first and second transmitters. A mobile device receives the broadcast datagrams for the logical identifier from the first transmitter by configuring the common link-level access parameters. As part of handover from the first cell to the second cell, the mobile device continues receiving the broadcast datagrams from the second transmitter by maintaining the common link-level access parameters. In one embodiment, the datagrams are IP datagrams transmitted in an MPEG2 transport stream. The link-level access parameters may include time slice parameters associated with burst transmissions from the first and second transmitters according to an embodiment of the invention.

16 Claims, 6 Drawing Sheets

US 6,977,914 B2

BROADCAST HAND-OVER IN A WIRELESS NETWORK

FIELD OF THE INVENTION

This invention relates to broadcast transmission of audio data, video data, control data, or other information and, in particular, to a system and method for providing broadcast handover in a wireless network.

BACKGROUND OF THE INVENTION

Video streaming, data streaming, and broadband digital broadcast programming are increasing in popularity in wireless network applications. As such, wireless data packets may be sent to multiple receivers (e.g. network enabled mobile devices) at the same time, which is referred to as multicasting or data casting. Currently, systems such as WLAN, digital video broadcast (DVB) systems and digital audio broadcast (DAB) systems can be used to transfer multicast data. In the future, UMTS or GPRS networks may also have the capability of supporting IP multicasting.

When a network enabled mobile device receives multicast data (e.g. IP datagrams) as part of a broadcast service, it must resolve the datagrams with associated logical parameters as well as link layer and/or physical layer parameters for the logical parameters. For example, it may need to associate datagrams for one or more IP addresses with a single logical identifier (e.g. a broadcast channel) and the logical identifier with link layer parameters. As part of handover of a mobile device receiving a particular multicast, the mobile device must generally resolve these parameters again. The time consumed for resolving these parameters during handover may increase latency, waste CPU time, and result in significant packet loss.

What is needed is a system and method for reducing the need to resolve datagrams to logical identifiers and logical identifiers to link and/or physical layer parameters during handoff of a network enabled mobile device receiving multicast data.

SUMMARY OF THE INVENTION

The present invention provides a system and method for providing broadcast handover in a mobile device within a mobile network that includes common link-level access parameters for datagrams associated with a logical identifier. As such, repeated resolution of datagrams to logical identifiers at a mobile device during handover is reduced. Further, repeated resolution of logical identifiers to some link layer parameters, such as time slice parameters, may be reduced.

In one embodiment, first and second transmitters within first and second cells broadcast multicast datagrams associated with a logical identifier according to link-level access parameters common to the first and second transmitters, such as time slice parameters. A mobile device receives the multicast broadcast channel for the logical identifier from the first transmitter by configuring the common link-level access parameters. As part of handover from the first cell to the second cell, the mobile device continues receiving the multicast broadcast channel from the second transmitter by maintaining the common link-level access parameters.

In one embodiment, the datagrams are IP datagrams transmitted in an MPEG2 transport stream. The link-level access parameters may include time slice parameters associated with burst transmissions from the first and second transmitters. In other embodiments of the invention, computer-executable instructions for implementing the disclosed methods are stored on computer-readable media. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

In the following description of the various embodiments, reference is made to the accompanying drawings that form a part thereof, and in which is shown by way of illustration various embodiment in which the invention may be practiced. It is to be understood that other embodiments may be utilized and structural and functional modifications may be made without departing from the scope of the present invention.

Figure 1:
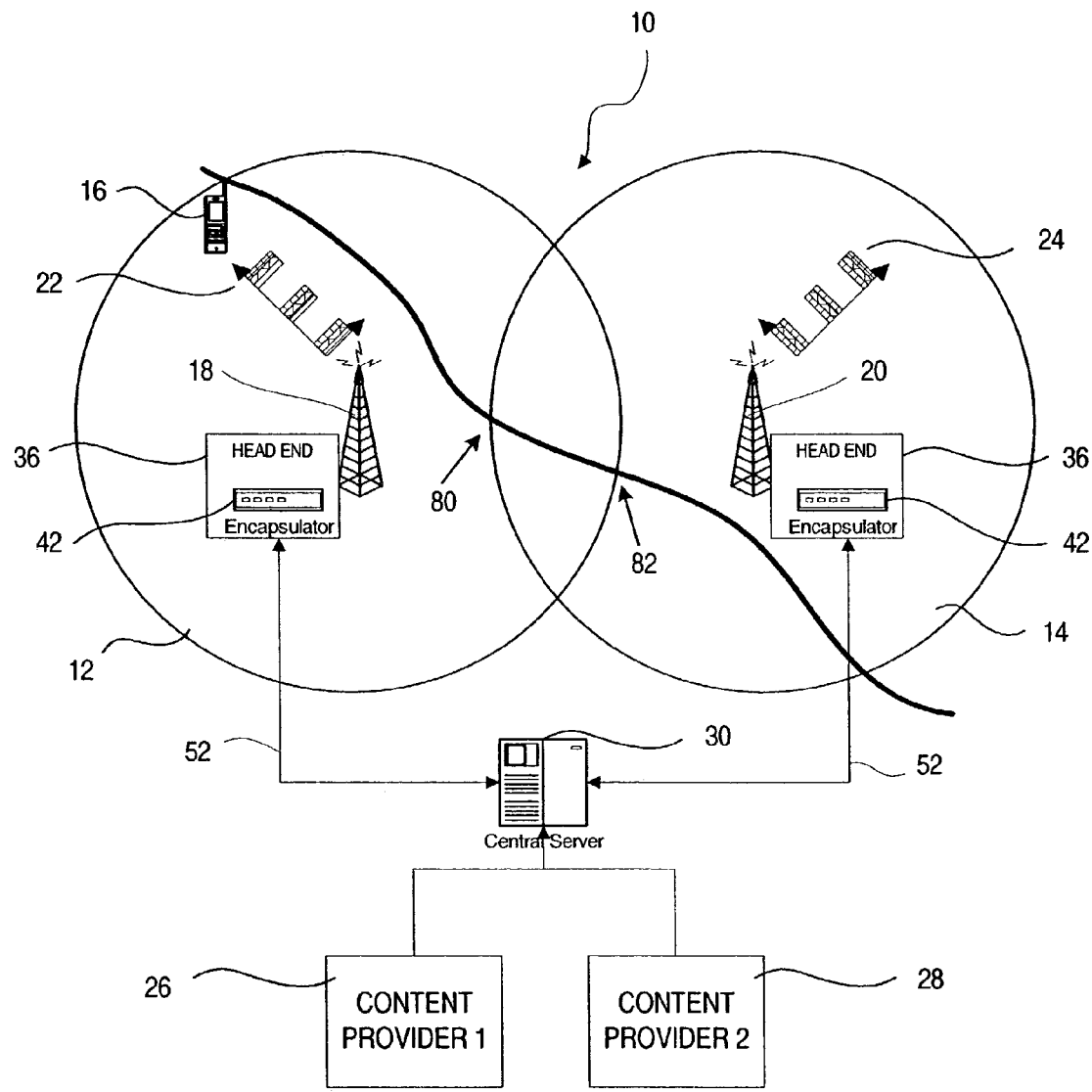
FIG. 1 shows a simplified diagram of a wireless communication network according to an embodiment of the invention including a wireless mobile device and transmitters in adjacent cells broadcasting multicast data.

FIG. 1 shows a wireless communication network 10 according to an embodiment of the invention that for simplicity includes a pair of adjacent wireless broadcast cells 12, 14, and a wireless mobile device 16 (e.g. mobile telephone, PDA, mobile terminal, etc.) moving from first cell 12 into second cell 14. The wireless network 10 may be for example, a second-generation mobile multimedia network, such as a Global System for Mobile Communications (GSM) network. However, a higher bandwidth network is preferred, such as a network including a terrestrial Digital Video Broadcast system (DVB-T), a Digital Audio Broadcast system (DAB), a Global Packet Radio Service (GPRS), a Universal Mobile Telecommunications System (UMTS), or a network that combines more than one of these broadcast systems. Each wireless cell 12, 14 generally includes a transmitter 18, 20 broadcasting multicast signals 22, 24 on a different frequency (or alternatively with a different code as appropriate) for each cell. Each cell broadcasts signals corresponding to broadcast information originating at one or more content providers 26, 28. Such broadcasts may conform to the Internet Group Management Protocol (IGMP) for IP multicasting.

Figure 2:
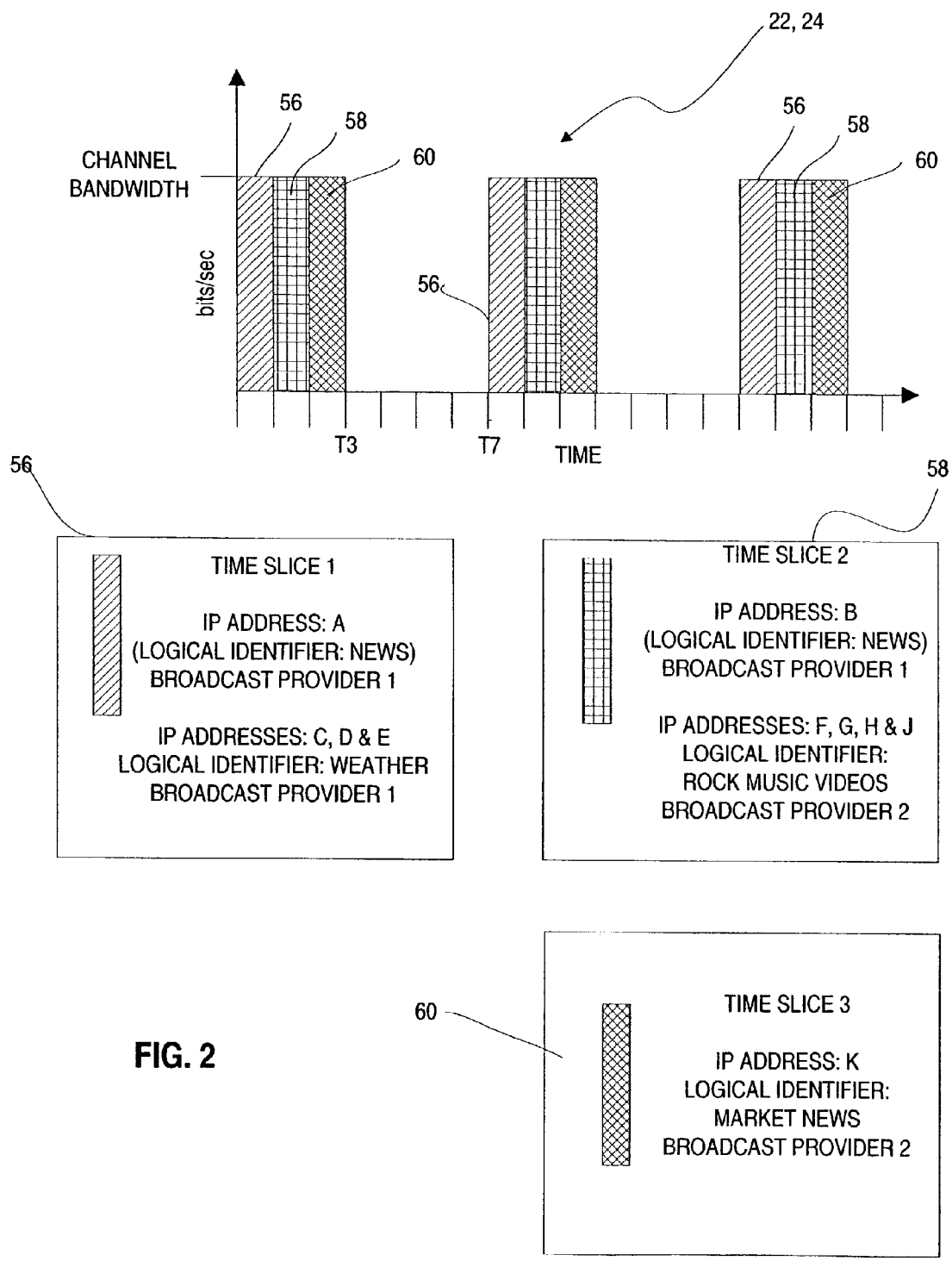
FIG. 2 is a graph representing burst signal broadcast streams from the transmitters in the wireless communications network of FIG. 1.

As shown in FIG. 2, each signal 22, 24 according to one embodiment includes burst transmissions, as is known in the relevant art, where each transmission burst or time slice corresponds to one or more transport streams. According to one embodiment, one or more transmission bursts are synchronized between cells within network 10, as are the transport streams and content of the transmission bursts. In some embodiments, the transmissions may be modulated as CDMA or TDMA transmissions. In such embodiments, transport streams and content (e.g. IP datagrams) may be synchronized between cells of network 10 to have common time divisions, encoding and/or digital sequencing. Each transport stream according to a burst transmission scenario contains one or more logical identifiers (e.g. broadcast channels) that are associated with one or more IP addresses.

Mobile device 16 may elect to receive one or more transport streams while in first cell 12 from signal 22, and therefore sets receiving parameters for tuning to corresponding burst transmissions of signal 22. Accordingly, mobile device 16 must perform IP address-to-logical identifier resolutions for each desired logical identifier, and logical identifier-to-link layer resolutions for those logical identifiers. When mobile device 16 moves from first cell 12 into second cell 14, a corresponding handover occurs. As such, mobile device 16 changes the receiving frequency to receive signal 24 from transmitter 20. If the transmission bursts of signals 22, 24 are not synchronous (e.g. the same transport streams are not contained in the same time slices and the same IP address transmissions are not correspondingly grouped), then mobile device 16 must perform IP address-to-logical identifier resolutions for each desired logical identifier as well as logical identifier-to-link layer resolutions for second cell 14. Maintaining IP address-to-logical identifier uniformity and logical identifier to link layer uniformity (e.g. time slices) within a network (i.e. for each cell of the network) improves handover of mobile device 16, reduces latency and data losses, and decreases computing requirements of the mobile device 16.

In one embodiment of the invention, multicast signals 22, 24 include MPEG-2 (MPEG2) transport streams (TS) that transport IP datagrams. This framework is compatible for broadcasting Digital Video Broadcasts (DVB), Digital Audio Broadcasts (DAB), Advanced Television Systems Committee (ATSC) broadcasts, and other MPEG2 based transmission systems. Other types of transmission systems may also be used with the present invention. Such systems are generally applicable for a variety of physical media, such as terrestrial TV, satellite TV, and cable transmission. Further, MPEG2 based transmission systems may support IP only networks.

In an MPEG2 based transmission system, datagrams, such as IP datagrams, Ethernet frames, or other sub-network data units (SNDUs), may be transported over MPEG2 in a number of parallel TS logical channels. Generally, an IP datagram has a source and a destination address. The source address is an address of the data originator, and the destination address is typically either a multicast or a unicast address. If the destination address is a multicast address, then that particular datagram is not sent to one individual receiver, but to a plurality of receivers. Multicast and broadcast services use the destination address as a multicast address. A logical channel generally represents level 2 of the OSI reference model and may be associated with datagrams for one or more IP flows, which is a particular combination of IP source and destination addresses. Datagrams for each IP flow are identified by a packet ID (PID), which is carried in the header of each MPEG2 TS packet.

As an example, FIG. 2 (which will be described more fully later) shows the contents of MPEG2 TS datagrams transported in Time Slices 1 and 2 of signals 22, 24. Suppose that datagrams associated with multicast IP address A (e.g. 1.2.3.4) include video data for a local news broadcast and datagrams associated with multicast IP address B (e.g. 5.6.7.9) include audio data for the same local news broadcast. Datagrams for both of these destination IP addresses are associated with a logical channel having a logical identifier, such as "News." When these datagrams are part of a MPEG2 TS, they will be transmitted in an MPEG TS datagram having a PID that identifies the logical channel/ logical identifier (e.g. "News"). Each of the PIDs (e.g. associated with both destination address A and B) will need to be mapped to the same logical channel at the receiver (e.g. mobile device 16).

Because other data may be broadcast in the same TS for logical identifier "news," the IP addresses associated with "news" will need to be identified and filtered. As such, IP address-to-logical identifier and logical identifier-to-link layer (e.g. time slice) resolution must occur to properly receive and process data for the channel "news." Prior to transmission in multicast signals 22, 24, data from content providers 26, 28 must be placed in a MPEG2 TS.

Figure 4:
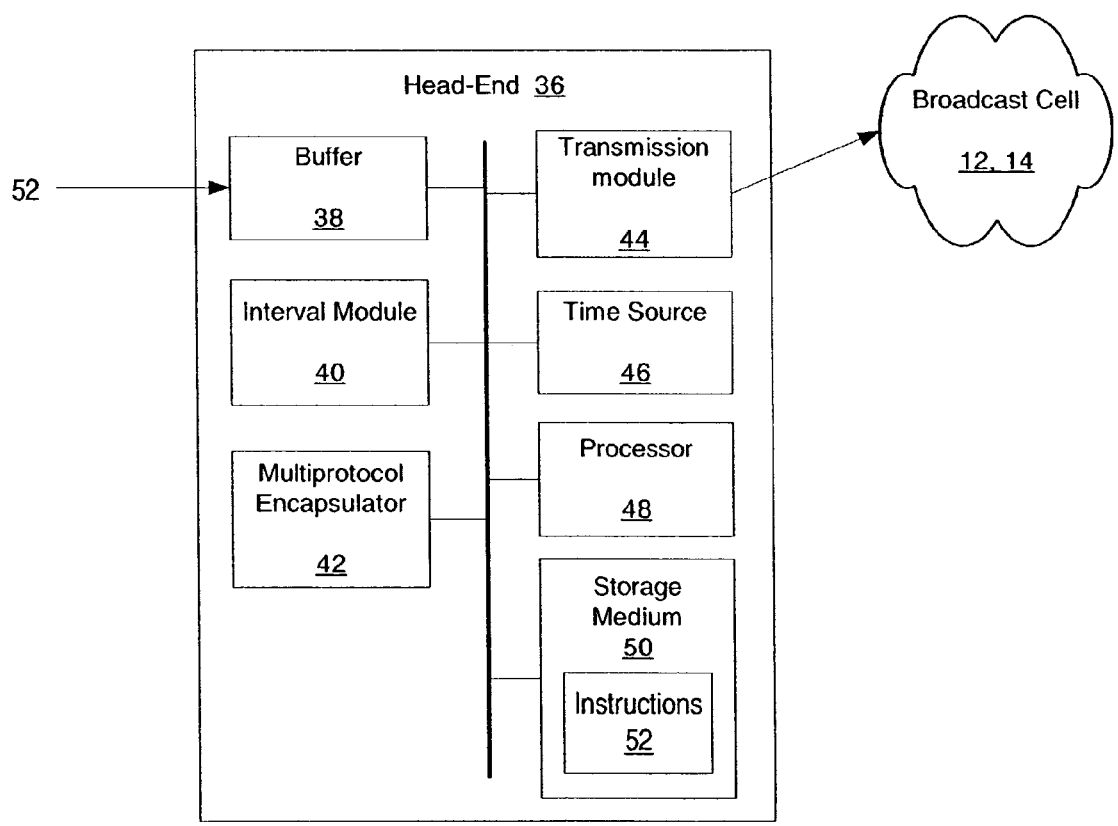
FIG. 4 is a functional block diagram of a head end system for the cells of FIG. 1.

As shown in FIG. 1, according to one embodiment, content providers 26, 28 may send such broadcast data to a central server 30 for network 10, which then transmits the data to a head end 36 for each cell 12, 14. As shown in FIG. 4, each head end 36 may generally include a buffer 38, interval module 40, multiprotocol encapsulator 42, transmission module 44, time source 46, processor 48 and storage medium 50 containing computer-readable instructions 52. In other embodiments, each head end 36 may individually receive broadcast data without the use of central server 30.

Although shown as one logical entity, these head end components may include one or more devices that may or may not be co-located. Buffer 38 receives a signal 52 from one or both of content providers 26, 28 (e.g. via central server 30) and stores segments of the signal. An interval module 40 may be used to determine a relative time period between the transmission bursts of content. A multiprotocol encapsulator 42 may be used to merge IP transport datagrams received from signal 52 into an outbound transport stream transmission burst in accordance with Section 7 of the European Standard EN 301192 *"Digital Video Broadcasting (DVB); DVB specification for data broadcasting."* Other data-embedding protocols could alternatively be used to create the outbound transport stream, such as data piping.

After encapsulation, each transmission burst is provided by the multiprotocol encapsulator 42 to a digital broadcast transmission module (e.g. transmitter) 44, which periodically sends the series of transmission bursts to one or more mobile devices 16. A time source 46 may be used by interval module 40 to calculate the relative time period between bursts of content. A processor 48 may be programmed with computer-executable instructions 52 stored in storage medium 50 to receive the content from the multiprotocol encapsulator 42 and format the data into bursts having a bandwidth and interval determined by interval module 40 and according to an interval synchronized within network 10 for particular IP datagrams and logical channels.

Figure 6:
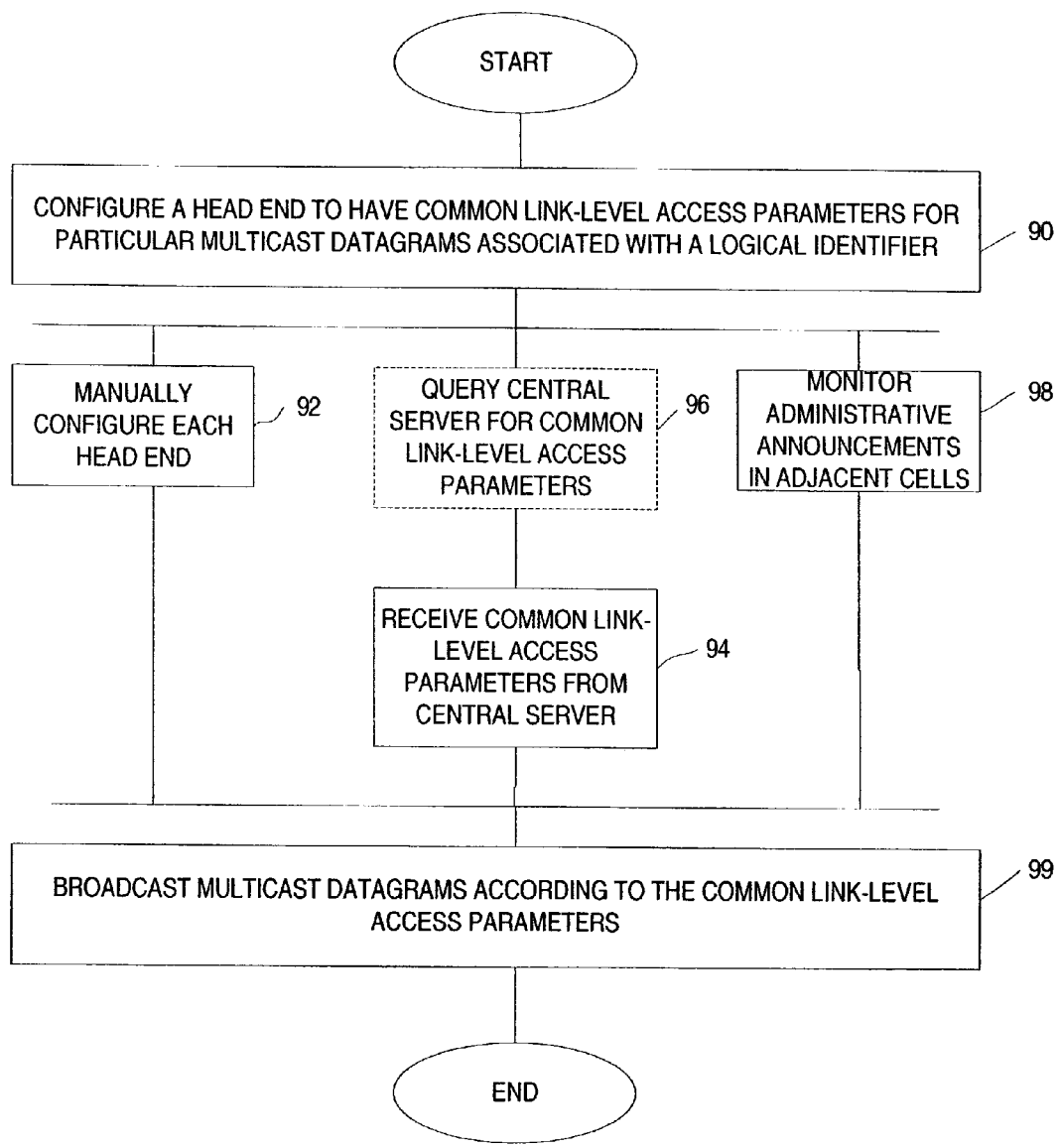
FIG. 6 is a flow diagram illustrating methods for configuring synchronous transmissions.

As shown in FIG. 6, methods for configuring 90 a head end to have common link-level access parameters for particular multicast datagrams are shown. According to one embodiment instructions 52 may be manually configured 92 by a network administrator to instruct multiprotocol encapsulator 42 to format the transport stream such that particular IP datagrams are transmitted in the same time slice for the entire network. For example, as shown in FIGS. 1 and 2, each head end 36 of cells 12 and 14 may be configured to transmit IP datagrams for IP addresses A and B, which are supplied by provider 26 and associated with logical identifier "news," in time slices 1 and 2 throughout network 10. In another embodiment, central server 30 may periodically provide 94 or update instructions 52 via communications with head end 36. For example, central server 30 may send updates according to a pre-determined schedule and/or as changes to broadcast content occur. In a further embodiment, head end 36 may request updates to instructions 52 as needed. For example, if mobile device requests reception of a particular multicast channel, head end 36 may query 96 central server 30 for updated broadcast instructions.

Communications between central server 30 and head end 36 may occur via back end communications or wireless message updates, as are known in the relevant art. In yet another embodiment, head end 36 for cell 12 may monitor 98 administrative announcements for adjacent cells to ensure synchronized transmissions. One or more of these embodiments may additionally be combined. For example, head end 36 may initially be manually configured with instructions 52, but may update instructions 52 by monitoring administrative announcements for adjacent cells. Once configured, head end 36 may broadcast 99 datagrams according to the common link-level access parameters for the datagrams and associated logical identifier.

FIG. 2 illustrates a series of bursts 56, 58, 60 of transmissions 22, 24 that may result from the processing performed by processor 48 and head end 36. Bursts 56, 58, 60 are periodic and may consume substantially all of the available channel bandwidth. In addition to the advantages of the present invention, a further advantage of this transmission scheme is that power may be removed from components of mobile device 16 between receptions of bursts. For example, between the end of burst 60 at time T3 and the beginning of burst 56 at time T7, no content is received at mobile device 16. Therefore, power may be removed from some of the components during such time periods where data is not transferred.

As discussed previously with regard to FIG. 4, transmission module 44 of head end 36 transmits the content bursts to network 12 for ultimate delivery to mobile device 16. As shown in FIG. 2, more than one content source 26, 28 may broadcast information in network 10 in the same or different channels 56, 58, 60. Additional content bursts may also be time division multiplexed or code division multiplexed with the series of content bursts 56, 58, 60.

Figure 3:
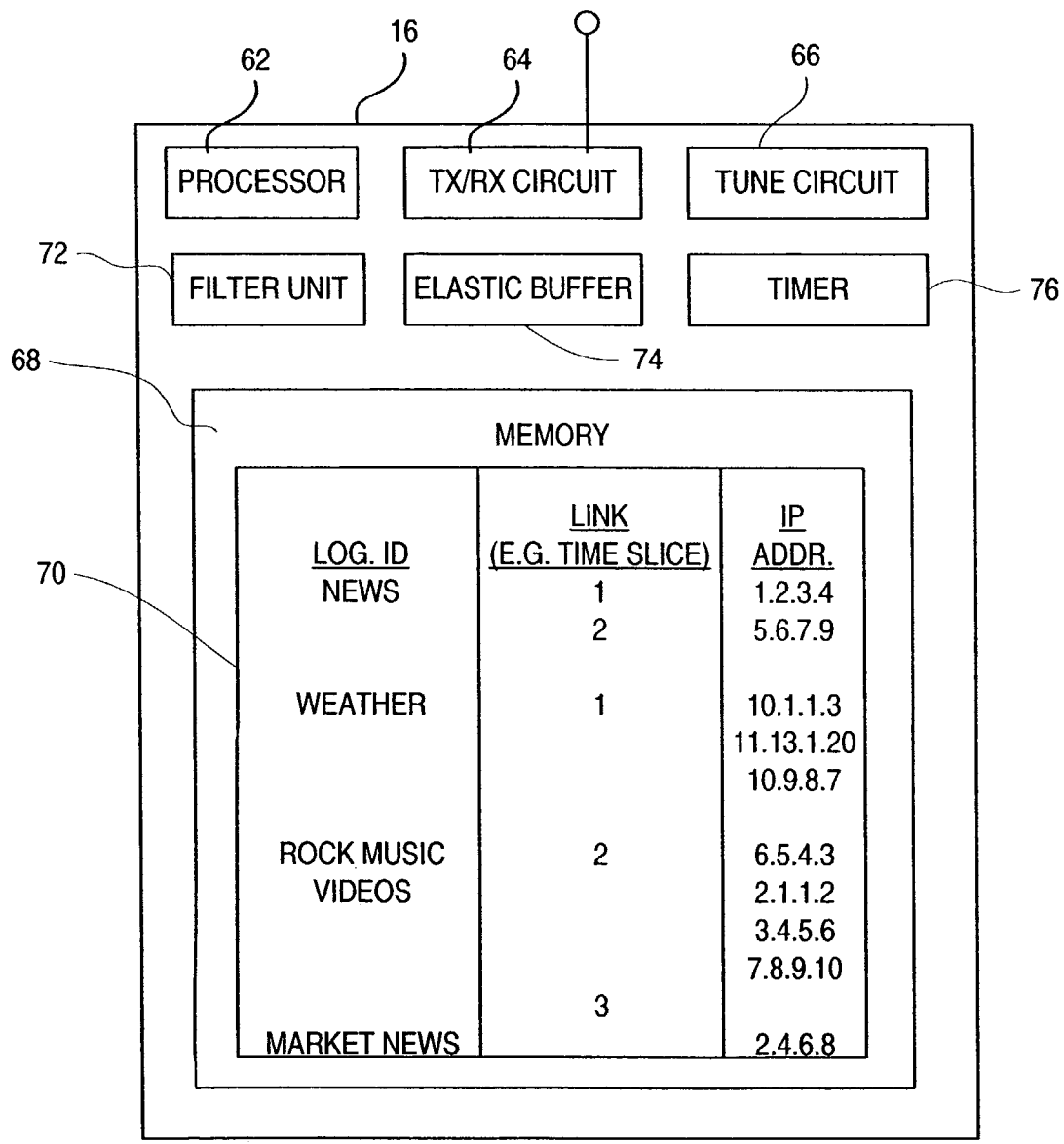
FIG. 3 is a functional block diagram of the wireless mobile device of FIG. 1.

Referring now to FIG. 3, a functional block diagram of an example mobile device 16 is shown. Mobile device 16 according to one embodiment generally includes a processor 62, digital broadcast receiver/transceiver 64, tuning circuit 66, memory 68, stream filtering unit 72, receiver elastic buffer 74 and tuning timer 76. Memory 68 may store channel and mapping information 70 such as logical identifier information, physical links, associated IP addresses, frequency, etc. This information 70 could be provided or updated at various times. For example, the mobile device 16 could receive multicast channels and mapping announcements including information 70 as it enters a cell, in response to a multicast connection request, or via periodic updates. Processor 62 accesses information 70 in memory 68, and in accordance with operating instructions stored therein, directs operation of mobile device 16. Transceiver 64 may be used by mobile device 16 to wirelessly communicate with cells to receive multicast channels and mapping announcements. Tuning circuit 66 tunes transceiver 64 to a desired channel for a particular broadcast cell in order to receive a particular multicast based on channel and mapping information 70 stored in memory 68 via direction from processor 62. More specifically, tuning circuit 66 may direct transceiver 64 to tune to desired channels of the current cell.

Tuner timer 76 measures the period between desired transmission bursts in order to power down and power up necessary components to receive desired broadcasts and to save power.

The digital broadcast receiver 64 provides the incoming series of transmission bursts 56, 58, 60 comprising signals 22, 24 to stream filtering unit 72, which strips the encapsulation from the individual transmission bursts and filters desired datagrams, such as IP datagrams associated with desired logical identifiers. The filtered output of the stream filtering unit 72 is then sent to a receiver elastic buffer 74. Buffer 74 functions to temporarily store filtered, stripped transmission bursts before being sent downstream to processor 62 for conversion into a substantially continuous information data stream or series of datagrams. It will be appreciated by those of skill in the art that two or more of the above components may be combined into a single component, and that any of the above components or combinations may be performed via hardware, software, or a combination of the two.

Figure 5:
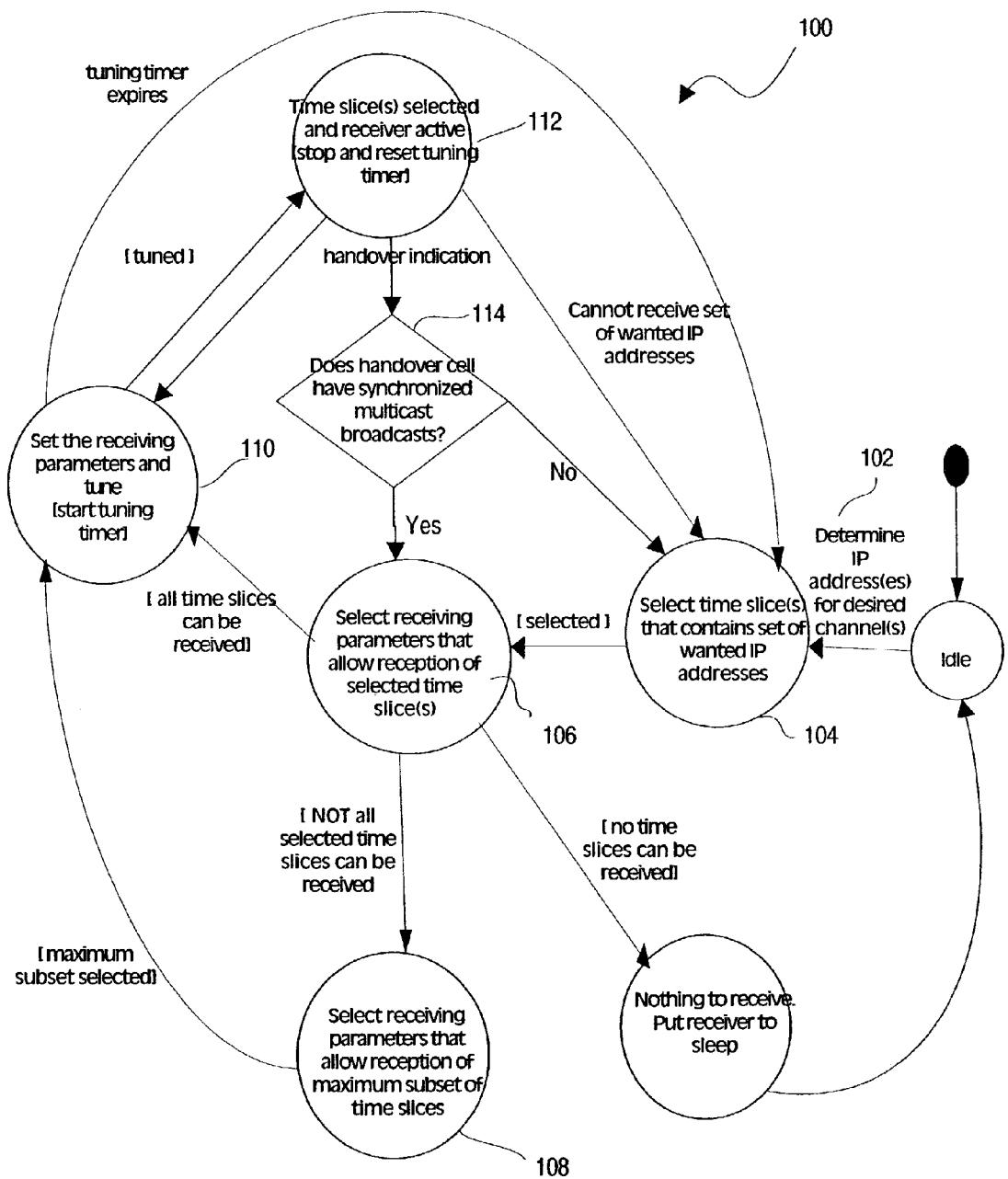
FIG. 5 is a flow diagram illustrating operation of the mobile device of FIG. 1.

Referring now to FIG. 5 along with FIGS. 1–4, FIG. 5 is a flow diagram illustrating operation of mobile device 16 according to an embodiment of the invention as it moves from first cell 12 to second cell 14. As an example for illustration purposes, suppose content providers 26, 28 together provide content for four broadcast channels represented by the following logical identifiers shown in FIG. 2: news, weather, rock music videos and market news. Suppose further that the IP addresses shown in FIG. 2 are associated with the indicated logical identifier. Suppose also that IP addresses A, C, D and E are broadcast in first time slice 56, IP addresses B, F, G, H and J are broadcast in second time slice 58, and IP address K is broadcast in third time slice 60. Suppose that as mobile device 16 enters cell 12 it receives an administrative announcement (not shown) providing channel, mapping, topology, and link-level information (e.g. frequency, MAC address, time slices, etc.) for the IP addresses and logical identifiers shown in FIG. 2 that are supported in cell 12 and network 10. Optionally, the administrative announcement(s) may identify other cells in the network that have link-level information for the same IP addresses.

According to the information provided in the administrative announcement(s), a user is able to select desired multicast channel(s) and to indicate such desires via an input device (not shown) on mobile device 16. However, according to the method 100 of FIG. 5, mobile device 16 can determine 102 the IP addresses for the channels desired. Suppose as an example that the user selected the "news" channel and the "market news" channel. Mobile device 16 therefore determines that it needs to receive datagrams associated with IP addresses A, B and K.

Consequently, mobile device 16 selects 104 the time slices that contain the desired IP addresses, such as first time slice 56, second time slice 58, and third time slice 60. Once selected, mobile device 16 can select 106 receiving parameters that allow reception of the time slices, such as the broadcast frequency for transmission 22 in cell 12. In some circumstances, not all time slices may be received. For example, suppose the user desires to receive broadcasts transmitted on different frequencies in the same cell (not shown) during the same time slice. If not all selected time slices can be received, mobile device selects 108 receiving parameters that allow reception of the maximum subset of time slices. Alternatively, mobile device 16 may be programmed to prompt the user to select between particular broadcasts in the event of a conflict.

If all time slices can be received, or if the maximum number available are selected, the mobile device 16 proceeds to set 110 the receiving parameters, such as to tune receiver 64 and to monitor for the desired time slice bursts. Once one or more desired time slices are received, tuning timer 76 is started to power up and power down receiver 64 and other components between transmissions. In preparation for receiving each desired time slice, timer 76 activates 112 the receiver 64 for receiving the selected time slices 56, 58, 60. After time slices 56, 58, 60 are received, timer 76 is reset and steps 110, 112 are repeated for continued reception. If timer 76 times out without receiving time slices 56, 58, 60, then the process begins again at step 104. Such a time out may occur if the signal is lost or if mobile device 16 hands over to a cell outside of the network or a cell not having synchronized broadcasts.

As the mobile device 16 moves from first wireless cell 12 into second wireless cell 14, the received signal strength of signal 22 may drop to a value less than the received signal strength of signal 24. Accordingly, when such a signal attenuation occurs or another predefined service signal criterion is met, such as between points 80 and 82 in FIG. 1, mobile device 16 may change from receiving the frequency of the first transmitter 18 broadcasting signal 22 to receiving the frequency used by second transmitter 20 broadcasting signal 24. Because multicast data according to this embodiment is broadcast in discrete synchronized bursts, a number of advantages are gained. One advantage is that the handover between cells can occur smoothly during "down" time between transmission bursts. Other advantages include CPU savings and improved handover related to synchronism of data transmissions (e.g. same IP datagrams to time slice and to logical identifier parameters) within network 10.

When IP datagrams associated with a logical identifier are broadcast in the same grouping and time slice for adjacent cells, then mobile device 16 does not need to repeat resolution of IP address-to-logical parameters as part of handover. As such, around the time of handover, mobile device 16 determines 114 if the handover is into a cell of the same network having synchronized multicast broadcasts. The mobile device 16 may make this determination based on administrative messages (not shown) received from either or both cells 12, 14 at the time of or prior to handover, as is known in the art. In one embodiment, such administrative messages (not shown) may include a flag indicating that the second cell 14 of network 10 has synchronized multicast broadcasts.As shown at step 114 in FIG. 5, at the time of handover, mobile device 16 determines whether the handover cell has synchronized multicast broadcasts with the current cell. It may do this by comparing timeslice channels it is currently receiving with timeslice channels available in the handover cell, as determined by administrative messages or other means. If the timeslice channels match, mobile device 16 moves to step 106 and maintains the timeslice channels for continued reception of desired channels. If timeslice channels do not match, mobile device 16 moves to step 104 and selects different timeslice channels as appropriate for the handover cell.

For instance, as mobile device 16 moves from cell 12 to cell 14, mobile device 16 may simply proceed to step 106 of FIG. 5 based on an administrative message (not shown) from transmitter 20 indicating synchronized network broadcasts. As such, mobile device 16 selects the receiving parameters for the same time slices 56, 60 to continue reception of the desired IP datagrams. Accordingly, mobile device 16 simply tunes to the frequency associated with signal 24 and powers up receiver 64 according to timer 76, which was reset when the last time slice transmission was received while in cell 12. Thus, not only is the handover seamless, but broadcast reception is seamless because mobile device 16 does not need to again resolve the IP datagram-to-logical identifier parameters (e.g. determine time slices) for receiving broadcast channels "news" and "market news" in cell 14. Accordingly, CPU savings are gained and the handover occurs seamlessly without latency or significant packet loss.

As can be appreciated by one skilled in the relevant art, the time-slicing digital broadcasting network 10 may use modulation/demodulation methods such as Frequency Division Multiple Access (FDMA), Time Division Multiple Access (TDMA), Code Division Multiple Access (CDMA), or Wideband CDMA (WCDMA) coding to assign different transmission channels to the different service providers. Such channels enable the mobile device 16 to distinguish between information and data provided by the various service providers and to enable the mobile device 16 to select one or more of such services for reception.

While the invention has been described with reference to particular embodiments, it will be understood that the present invention is by no means limited to the particular constructions and methods herein disclosed and/or shown in the drawings, but also comprises any modifications or equivalents within the scope of the claims.

We claim:

1. A method for maintaining reception of a broadcast channel at a mobile device during handover from a first transmitter for a first cell to a second transmitter for a second cell, the method comprising the steps of:

setting a link-level access parameter on the mobile device for receiving datagrams associated with a logical identifier while the mobile device is in communication with the first transmitter, the link-level access parameter being selected from the group consisting of a time slice for a synchronized series of transmission bursts from the first and second transmitters, synchronized encoding for transmissions from the first and second transmitters, and synchronized digital sequencing for transmissions from the first and second transmitters;

in response to setting the link-level access parameter, receiving from the first transmitter a first datagram associated with the logical identifier;

determining whether the second cell is one of a group of adjacent cells having common link-level access parameters for multicast broadcasts; and if the second cell is one of the group of adjacent cells having common link-level access parameters, continuing the link-level access parameter on the mobile device during handover from the first cell to the second cell for continued reception of the broadcast channel; and in response to continuing the link-level access parameter, receiving from the second transmitter a second datagram associated with the logical identifier;

wherein the step of determining comprises receiving from the second transmitter in the second cell an administrative message identifying the second cell as one of the group of cells having common link-level access parameters for multicast broadcasts.

2. The method of claim 1, wherein the steps of receiving from the first transmitter a first datagram, and receiving from the second transmitter a second datagram, each comprises receiving an IP datagram associated with the logical identifier.

3. The method of claim 1, wherein the steps of receiving from the first transmitter a first datagram, and receiving from the second transmitter a second datagram, each comprises receiving a datagram encapsulated in a transport stream datagram having a packet identifier associated with the logical identifier.

4. The method of claim 3, wherein the encapsulation conforms to standard EN 301192.

5. The method of claim 3, wherein the transport stream comprises a MPEG-2 transport stream.

6. The method of claim 1, wherein the steps of receiving from the first transmitter a first datagram, and receiving from the second transmitter a second datagram, each comprises receiving a datagram that is part of a digital video broadcast terrestrial (DVB-T) multicast transmission.

7. The method of claim 1, wherein the steps of receiving from the first transmitter a first datagram, and receiving from the second transmitter a second datagram, each comprises receiving a datagram that is part of a Universal Mobile Telecommunications System multicast.

8. A method for maintaining reception of a broadcast channel at a mobile device during handover from a first cell to a second cell, the method comprising the steps of:
   setting a link-level access parameter on the mobile device for receiving datagrams associated with a logical identifier while the mobile device is in communication with a first transmitter for the first cell;
   in response to setting the link-level access parameter, receiving from the first transmitter a first datagram associated with the logical identifier;
   maintaining the reception related to the logical identifier on the mobile device during handover from the first cell to the second cell; and
   in response to maintaining the reception related to the logical identifier, receiving from a second transmitter for the second cell a second datagram associated with the logical identifier;
   wherein the step of maintaining the reception related to the logical identifier comprises the steps of:
      determining whether the second cell is one of a group of adjacent cells having common link-level access parameters for multicast broadcasts; and
      on condition the second cell is one of the group of adjacent cells having common link-level access parameters, continuing the link-level access parameter for continued reception of the broadcast channel; and
   wherein the step of determining comprises receiving from the second transmitter in the second cell an administrative message identifying the second cell as one of the group of cells having common link-level access parameters for multicast broadcasts.

9. The method of claim 8, wherein the step of determining comprises receiving from the first transmitter in the first cell an administrative message identifying the second cell as one of the group of cells having common link-level access parameters for multicast broadcasts.

10. A mobile device comprising:
   a processor; and
   memory for storing computer readable instructions that, when executed by the processor, cause the mobile device to perform steps related to maintaining reception of a broadcast channel during handover from a first transmitter for a first cell to a second transmitter for a second cell, the steps comprising:
      setting a link-level access parameter on the mobile device for receiving datagrams associated with a logical identifier while the mobile device is in communication with the first transmitter for the first cell, the link-level access parameter being selected from the group consisting of a time slice for a synchronized series of transmission bursts from the first and second transmitters, synchronized encoding for transmissions from the first and second transmitters, and synchronized digital sequencing for transmissions from the first and second transmitters;
      in response to setting the link-level access parameter, receiving from the first transmitter a first datagram associated with the logical identifier;
      determining whether the second cell is one of a group of adjacent cells having common link-level access parameters for multicast broadcasts;
      if the second cell is one of the group of adjacent cells having common link-level access parameters, continuing the link-level access parameter for continued reception of the broadcast channel on the mobile device during handover from the first cell to the second cell; and
      in response to continuing the link-level access parameter, receiving from the second transmitter for the second cell a second datagram associated with the logical identifier;
      wherein the step of determining comprises receiving from one of the second transmitter in the second cell and the first transmitter in the first cell an administrative message identifying the second cell as one of the group of cells having common link-level access parameters for multicast broadcasts.

11. The mobile device of claim 10, wherein the link-level access parameter comprises the time slice for a synchronized series of transmission bursts from the first and second transmitters and the step of setting a link-level access parameter comprises monitoring the time slice in which datagrams associated with the logical identifier are broadcast in both the first and second cells.

12. The mobile device of claim 10, wherein the steps of receiving from the first transmitter a first datagram, and receiving from the second transmitter a second datagram, each comprises receiving an IP datagram associated with the logical identifier.

13. The mobile device of claim 10, wherein the steps of receiving from the first transmitter a first datagram, and receiving from the second transmitter a second datagram, each comprises receiving a datagram encapsulated in a transport stream datagram having a packet identifier associated with the logical identifier.

14. The mobile device of claim 10, wherein the step of determining comprises receiving from the second transmitter in the second cell the administrative message identifying the second cell as one of the group of cells having common link-level access parameters for multicast broadcasts.

15. The mobile device of claim 10, wherein the step of determining comprises receiving from the first transmitter in the first cell the administrative message identifying the second cell as one of the group of cells having common link-level access parameters for multicast broadcasts.

16. A method for maintaining reception of a multicast broadcast channel at a mobile device during handover from a first cell to a second cell, the method comprising the steps of:
   setting a link-level access parameter on the mobile device for receiving multicast datagrams associated with a logical identifier while the mobile device is in communication with a first transmitter for the first cell, the link-level access parameter comprising a time slice for a synchronized series of transmission bursts from the first transmitter and a second transmitter associated with the second cell, the step of setting comprising monitoring a time slice in which multicast datagrams associated with the logical identifier are broadcast in both the first and second cells;

in response to setting the link-level access parameter, receiving from the first transmitter a first multicast datagram associated with the logical identifier;

maintaining the reception related to the logical identifier on the mobile device during handover from the first cell to the second cell, the step of maintaining comprising:

determining whether the second cell is one of a group of adjacent cells having common link-level access parameters for multicast broadcasts; and on condition the second cell is one of the group of adjacent cells having common link-level access parameters, continuing the link-level access parameter for continued reception of the broadcast channel; and in response to maintaining the reception related to the logical identifier, receiving from the second transmitter for the second cell a second multicast datagram associated with the logical identifier;

wherein the step of determining comprises receiving from the second transmitter in the second cell an administrative message identifying the second cell as one of the group of cells having common link-level access parameters for multicast broadcasts.

* * * * *